United States Patent
Maruyama et al.

(10) Patent No.: US 12,386,573 B2
(45) Date of Patent: Aug. 12, 2025

(54) INFORMATION PROCESSING APPARATUS, TERMINAL DEVICE, AND NON-TRANSITORY COMPUTER READABLE MEDIUM STORING INFORMATION PROCESSING PROGRAM

(71) Applicant: FUJIFILM Business Innovation Corp., Tokyo (JP)

(72) Inventors: Satoshi Maruyama, Kanagawa (JP); Masaki Watanabe, Kanagawa (JP); Yusuke Taguchi, Kanagawa (JP); Ryo Matsumoto, Kanagawa (JP); Ayumi Tsuji, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 518 days.

(21) Appl. No.: 17/739,151

(22) Filed: May 8, 2022

(65) Prior Publication Data
US 2023/0161530 A1    May 25, 2023

(30) Foreign Application Priority Data
Nov. 19, 2021   (JP) ................. 2021-188964

(51) Int. Cl.
*G06F 3/12*    (2006.01)

(52) U.S. Cl.
CPC .......... *G06F 3/1258* (2013.01); *G06F 3/1204* (2013.01); *G06F 3/1236* (2013.01)

(58) Field of Classification Search
CPC .... G06F 3/1258; G06F 3/1204; G06F 3/1236; G06F 3/1292; H04N 1/00503; H04N 1/00514
See application file for complete search history.

(56) References Cited

U.S. PATENT DOCUMENTS

| | | | |
|---|---|---|---|
| 2015/0138582 A1* | 5/2015 | Ito | H04N 1/00206 358/1.13 |
| 2016/0182757 A1* | 6/2016 | Yoo | H04M 1/72412 358/1.15 |
| 2020/0412901 A1* | 12/2020 | Watanabe | G06F 21/602 |

FOREIGN PATENT DOCUMENTS

JP    2020010116    1/2020

* cited by examiner

*Primary Examiner* — John R Wallace
(74) *Attorney, Agent, or Firm* — JCIPRNET

(57) ABSTRACT

An information processing apparatus includes a processor configured to: receive setting information that includes settings related to a user interface reflected in a terminal device connected to use the information processing apparatus; and reflect the received setting information in settings related to a user interface of the information processing apparatus.

12 Claims, 4 Drawing Sheets

| SETTING ITEM | | SET VALUE OF SMARTPHONE | SET VALUE OF IMAGE FORMING APPARATUS |
|---|---|---|---|
| OS1 | NOTIFICATION SOUND | ON | ON |
| | | OFF | OFF |
| | BRIGHTNESS | 1 | 10 |
| | | 2 | 20 |
| | | 3 | 30 |
| | FONT SIZE | LARGE | 36 |
| | | MEDIUM | 24 |
| | | SMALL | 12 |
| OS2 | ... | ... | ... |
| ... | | | |

| SETTING ITEM | | SET VALUE OF SMARTPHONE | SET VALUE OF IMAGE FORMING APPARATUS |
|---|---|---|---|
| OS1 | NOTIFICATION SOUND | ON | ON |
| | | OFF | OFF |
| | BRIGHTNESS | 1 | 10 |
| | | 2 | 20 |
| | | 3 | 30 |
| | FONT SIZE | LARGE | 36 |
| | | MEDIUM | 24 |
| | | SMALL | 12 |
| OS2 | ... | ... | ... |
| ... | | | |

INFORMATION PROCESSING APPARATUS, TERMINAL DEVICE, AND NON-TRANSITORY COMPUTER READABLE MEDIUM STORING INFORMATION PROCESSING PROGRAM

CROSS-REFERENCE TO RELATED APPLICATIONS

This application is based on and claims priority under 35 USC 119 from Japanese Patent Application No. 2021-188964 filed Nov. 19, 2021.

BACKGROUND

(i) Technical Field

A technology of the present invention relates to an information processing apparatus, a terminal device, and a non-transitory computer readable medium storing an information processing program.

(ii) Related Art

There is a technology for adding settings related to notification sound to job information.

JP2020-010116A discloses an image forming apparatus that executes a job which is an executive instruction generated by a terminal device. The image forming apparatus includes a speaker for outputting notification sound, outputs the notification sound on the basis of notification information that is information related to the notification sound added to the job by the terminal device, and executes the job.

SUMMARY

There is a technology that transmits job information, to which setting information related to a user interface is added, to the information processing apparatus and reflects the settings of the setting information in the output of a user interface of the information processing apparatus.

However, the setting information needs to be manually added whenever a user transmits a job. In a case where a user forgets to add the setting information, the mode of an output from the user interface of the information processing apparatus is not changed into a mode intended by the user.

Aspects of non-limiting embodiments of the present disclosure relate to an information processing apparatus and a non-transitory computer readable medium storing an information processing program that can change the settings of a user interface without being necessary for a user to manually add the setting information of the information processing apparatus to job information.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to: receive setting information that includes settings related to a user interface reflected in a terminal device connected to use the information processing apparatus; and reflect the received setting information in settings related to a user interface of the information processing apparatus.

BRIEF DESCRIPTION OF THE DRAWINGS

Exemplary embodiment(s) of the present invention will be described in detail based on the following figures, wherein.

DETAILED DESCRIPTION

Figure 1:
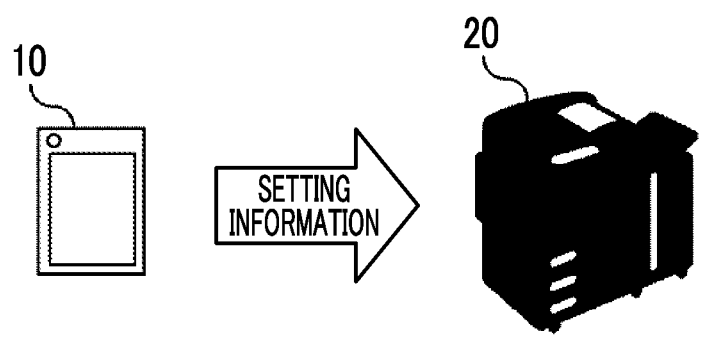
FIG. 1 is a diagram showing the schematic configuration of an information processing system.

An example of an exemplary embodiment of the technology of the present disclosure will be described below with reference to the drawings. In the respective drawings, identical or equivalent components and portions will be denoted by identical reference numerals. Further, since the scales of the drawings are exaggerated for convenience of description, there is a case where the scales are different from actual scales.

FIG. 1 is a diagram showing the schematic configuration of an information processing system according to the exemplary embodiment of the present disclosure. The information processing system includes a terminal device and an information processing apparatus. In the exemplary embodiment, a case where a smartphone is used as the terminal device will be described and the smartphone will be denoted by reference numeral 10. Likewise, in the exemplary embodiment, a case where an image forming apparatus is used as the information processing apparatus will be described and the image forming apparatus will be denoted by reference numeral 20.

The smartphone 10 is a device that is used to use the image forming apparatus 20. The smartphone 10 includes a user interface. The user interface is, for example, an input unit, a display unit, a speaker, or the like. The smartphone 10 transmits setting information, which includes settings related to the user interface, to the image forming apparatus 20. The settings related to the user interface include setting items and set values. The settings related to the user interface are, for example, the notification sound setting of the speaker, the language setting of the display language of the display unit, the brightness setting of the brightness of the display unit, or the text size setting of texts to be displayed on the display unit. The setting information is, for example, the type of the operating system (OS), the version of OS, the model number of the model of the smartphone 10, or the like.

The image forming apparatus 20 is an image forming apparatus capable of executing processing, such as printing, copying, scanning, and facsimile. The image forming apparatus 20 receives the setting information of the smartphone 10.

Figure 2:
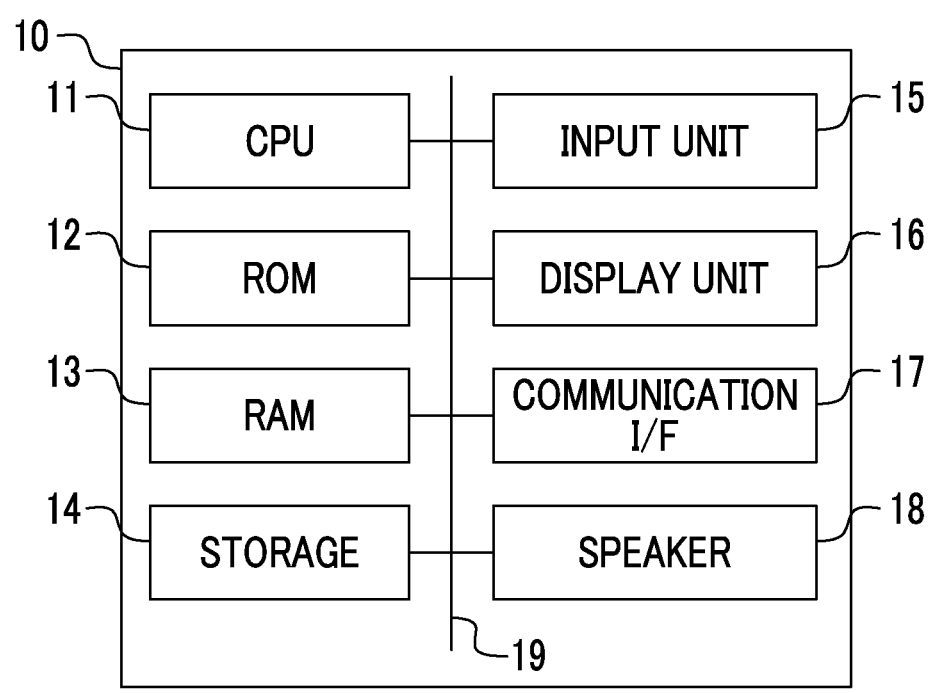
FIG. 2 is a block diagram showing the hardware configuration of a smartphone according to an exemplary embodiment.

FIG. 2 is a block diagram showing the hardware configuration of the smartphone 10. The smartphone 10 includes various components, such as a central processing unit (CPU) 11, a read only memory (ROM) 12, a random access memory (RAM) 13, a storage 14, an input unit 15, a display unit 16, a communication interface (communication I/F) 17, and a speaker 18. The respective components are connected to each other to be capable of communicating with each other via a bus 19.

The CPU 11 is a central processing unit, and executes various programs or controls each part. That is, the CPU 11 reads out programs from the ROM 12 or the storage 14 and executes the programs using the RAM 13 as a work area. The CPU 11 controls the respective components and executes various types of arithmetic processing according to the programs recorded in the ROM 12 or the storage 14. In the exemplary embodiment, an information processing program transmitting the setting information is stored in the ROM 12 or the storage 14.

The ROM 12 stores various programs and various data. The RAM 13 temporarily stores programs or data as a work area. The storage 14 is formed of a hard disk drive (HDD) or a solid state drive (SSD), and stores various programs including an operating system and various data.

The input unit 15 includes a pointing device, such as a mouse, and a keyboard, and is used to perform various inputs.

The display unit 16 is, for example, a liquid crystal display and displays various types of information. The display unit 16 may adopt a touch panel system and function as the input unit 15.

The communication interface 17 is an interface that is used to communicate with other devices, such as a database. For example, standards, such as Ethernet (registered trademark), FDDI, and Wi-Fi (registered trademark), are used for the communication interface 17.

The speaker 18 outputs sound. In a case where the notification sound setting is ON, the speaker 18 outputs notification sound at the time of the reception of an operation input, at the time of the occurrence of an error, or the like.

Figure 3:
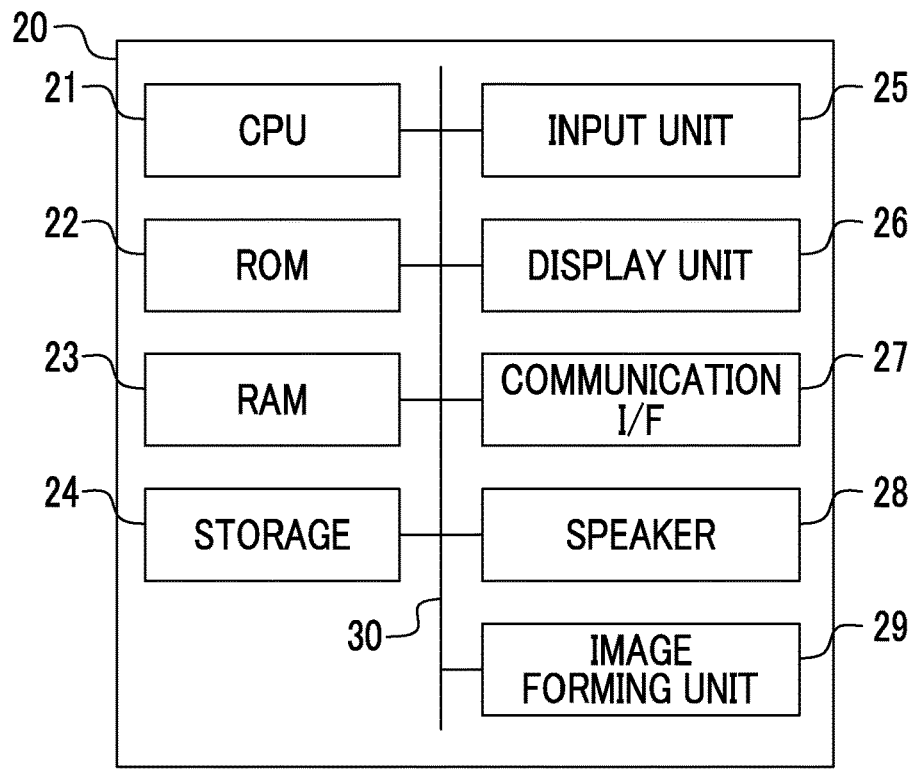
FIG. 3 is a block diagram showing the hardware configuration of an image forming apparatus according to the exemplary embodiment.

FIG. 3 is a block diagram showing the hardware configuration of the image forming apparatus 20. The image forming apparatus 20 includes various components, such as a CPU 21, a ROM 22, a RAM 23, a storage 24, an input unit 25, a display unit 26, a communication interface (communication I/F) 27, a speaker 28, and an image forming unit 29. The respective components are connected to each other to be capable of communicating with each other via a bus 30.

The CPU 21 is a central processing unit, and executes various programs or controls each part. That is, the CPU 21 reads out programs from the ROM 22 or the storage 24 and executes the programs using the RAM 23 as a work area. The CPU 21 controls the respective components and executes various types of arithmetic processing according to the programs recorded in the ROM 22 or the storage 24. In the exemplary embodiment, an information processing program reflecting the setting information is stored in the ROM 22 or the storage 24.

The ROM 22 stores various programs and various data. The RAM 23 temporarily stores programs or data as a work area. The storage 24 is formed of an HDD or an SSD, and stores various programs including an operating system and various data.

The input unit 25 includes a pointing device, such as a mouse, and a keyboard, and is used to perform various inputs.

The display unit 26 is, for example, a liquid crystal display and displays various types of information. The display unit 26 may adopt a touch panel system and function as the input unit 25.

The communication interface 27 is an interface that is used to communicate with other devices, such as a database. For example, standards, such as Ethernet (registered trademark), FDDI, and Wi-Fi (registered trademark), are used for the communication interface 27.

The speaker 28 outputs sound. In a case where the notification sound setting is ON, the speaker 28 outputs notification sound at the time of the reception of an operation input, at the time of the occurrence of an error, or the like.

The image forming unit 29 is to form printing data on a recording medium, such as paper. A toner system, an inkjet system, and the like are adapted as a system for forming an image.

Next, the action of the smartphone 10 will be described.

Figure 4:
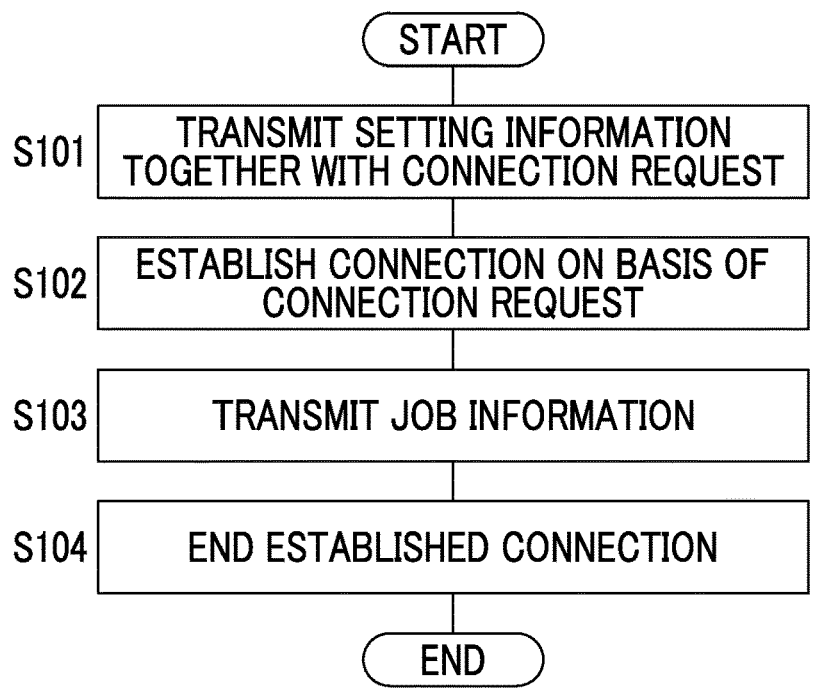
FIG. 4 is a flowchart showing the flow of transmission processing of the smartphone according to the exemplary embodiment.

FIG. 4 is a flowchart showing the flow of transmission processing of the smartphone 10. The CPU 11 reads out a transmission program from the ROM 12 or the storage 14 and develops the transmission program in the RAM 13 to execute the transmission program, so that transmission processing is executed.

In Step S101, the CPU 11 transmits the setting information together with a connection request. That is, the CPU 11 transmits the connection request for starting to use the image forming apparatus 20 that is an external information processing apparatus. Then, the CPU 11 transmits even the setting information, which includes settings related to the user interface reflected in the smartphone 10 used as the terminal device, when transmitting the connection request. The connection request is a request for establishing communication using, for example, Near field communication (NFC), Bluetooth (registered trademark), Wi-Fi (registered trademark), or the like. The CPU 11 proceeds to Step S102.

In Step S102, the CPU 11 establishes a connection on the basis of the connection request. The CPU 11 proceeds to Step S103.

In Step S103, the CPU 11 transmits job information. The job information is information that is used to execute the function of the image forming apparatus 20. The CPU 11 proceeds to Step S104.

In Step S104, the CPU 11 ends the established connection. The CPU 11 ends the transmission processing.

As described above, the smartphone 10 transmits the setting information, which includes the settings related to the user interface reflected in the terminal device, to cause the setting information to be reflected in the image forming apparatus 20 by the processing of Steps S101 to S103. Here, in the smartphone 10, a user does not need to manually determine the settings to be reflected in the image forming apparatus 20.

Next, the action of the image forming apparatus 20 will be described.

Figure 5:
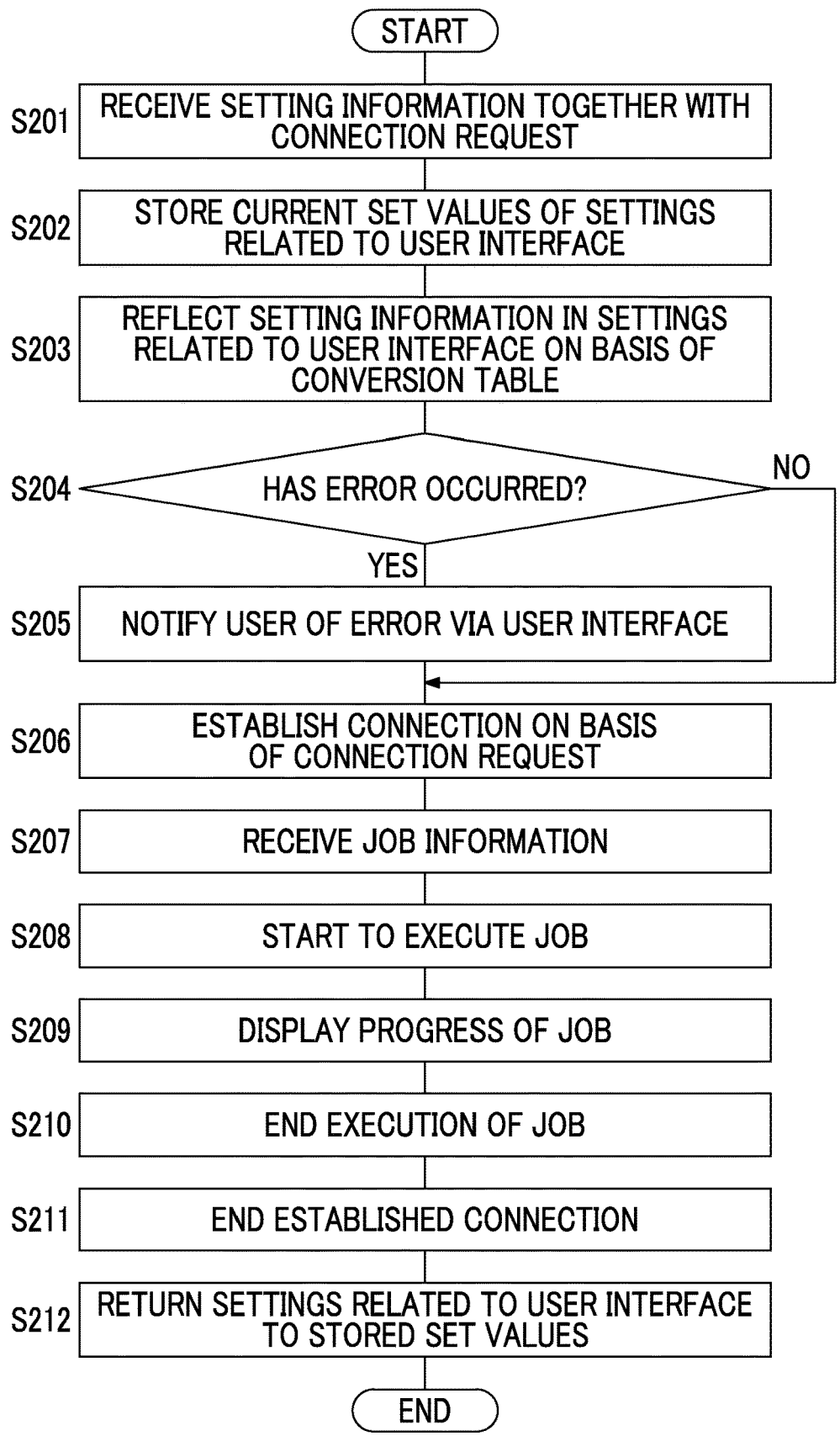
FIG. 5 is a flowchart showing the flow of reflection processing of the image forming apparatus according to the exemplary embodiment.

FIG. 5 is a flowchart showing the flow of reflection processing of the image forming apparatus 20. The CPU 21 reads out a reflection program from the ROM 22 or the storage 24 and develops the reflection program in the RAM 23 to execute the reflection program, so that reflection processing is executed.

In Step S201, the CPU 21 receives the setting information together with the connection request. That is, the CPU 21 receives the connection request for causing the image forming apparatus 20 to start to be used by the smartphone 10. Then, the CPU 21 receives even the setting information when receiving the connection request. The CPU 21 proceeds to Step S202.

In Step S202, the CPU 21 stores current set values of the settings related to the user interface in the ROM 22 or the storage 24. The CPU 21 proceeds to Step S203.

In Step S203, the CPU 21 reflects the setting information in the settings related to the user interface on the basis of a conversion table. The CPU 21 proceeds to Step S204.

Figures 6, 7:
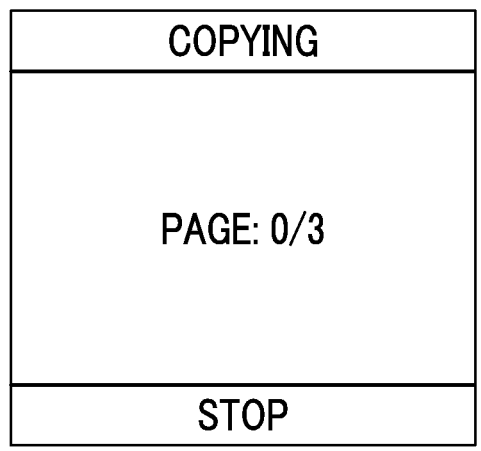
FIG. 6 is a diagram showing an example of a conversion table of the image forming apparatus according to the exemplary embodiment.
FIG. 7 is a diagram showing an example of a display screen of the image forming apparatus according to the exemplary embodiment.

Here, an example of the conversion table is shown in FIG. 6. The conversion table is a table in which the setting information and the settings related to the user interface of the image forming apparatus 20 are associated with each other in advance. The conversion table includes, for example, setting items, the set values of the smartphone 10, and the set values of the image forming apparatus 20 as items. The setting items are, for example, notification sound, brightness, and a font size. The setting items may be prepared for each type or version of OS. The CPU 21 reflects a set value, which is obtained for each setting item from the conversion table, in the image forming apparatus 20 used as the information processing apparatus. The CPU 21 converts the set values of the smartphone 10 into the set values of the image forming apparatus 20 using predetermined processing. The predetermined processing is, for example, processing for multiplying the set value by a predetermined value, processing for converting the set value into a value, which is associated with the set value in advance, or the like. For example, with regard to brightness, the CPU 21 sets a value, which is obtained by multiplying the set value of the smartphone 10 by 10, as the set value of the image forming apparatus 20 in a case where the type of OS is OS1. As a specific example, the CPU 21 sets the set value of the brightness of the image forming apparatus 20 to 20 in a case where the set value of the brightness of the smartphone 10 is 2. Further, for example, with regard to a font size, the CPU 21 changes the set value of the image forming apparatus 20 to 36, 24, and 12 in order in a case where the type of OS is OS1 and the font size of the smartphone 10 is changed to large, medium, and small.

In Step S204, the CPU 21 determines whether or not an error has occurred. The type of error does not matter. An error is, for example, the insufficient replenishment of recording mediums, the insufficient power supply of a power source, an operation error made by a user, or the like. Further, an error may be the failure of the interface that occurs in a case where the setting information is reflected in the user interface in Step S203. In a case where the CPU 21 determines that an error has occurred (YES in Step S204), the CPU 21 proceeds to Step S205. In a case where the CPU 21 determines that an error has not occurred (NO in Step S204), the CPU 21 proceeds to Step S206.

In Step S205, the CPU 21 notifies a user of the error via the user interface. That is, the CPU 21 notifies the user of the error on the basis of the settings related to the user interface reflected in Step S203. For example, in a case where the notification sound setting is set to ON in Step S203, the CPU 21 notifies the user of the error using notification sound output from the speaker 28. The CPU 21 proceeds to Step S206. In a case where the error is the failure of the interface that occurs in a case where the setting information is reflected in the user interface in Step S203, the CPU 21 may notify the user of the occurrence of the error in a state where there is a failure in a part of the interface. Alternatively, in a case where the error is the failure of the interface that occurs in a case where the setting information is reflected in the user interface in Step S203, the CPU 21 may notify the user of the error using the interface in a state where the set value causing the error has returned to a state where the setting information is not yet reflected.

In Step S206, the CPU 21 establishes a connection on the basis of the connection request. The CPU 21 proceeds to Step S207.

In Step S207, the CPU 21 receives the job information. The CPU 21 proceeds to Step S208.

In Step S208, the CPU 21 starts to execute a job. That is, the CPU 21 executes a job on the basis of the job information received in Step S207. The CPU 21 proceeds to Step S209.

In Step S209, the CPU 21 displays the progress of the job. The CPU 21 proceeds to Step S210.

Here, the display of the progress of the job is shown in FIG. 7 as an example of the display screen of the display unit 26 of the image forming apparatus 20. For example, the CPU 21 displays a message according to the language setting of the display language of the display unit 26. Further, for example, the CPU 21 displays a display screen with the degree of brightness according to the brightness setting of the brightness of the display unit 26. Furthermore, for example, the CPU 21 displays texts according to the text size setting of texts to be displayed on the display unit.

In Step S210, the CPU 21 ends the execution of the job. The CPU 21 proceeds to Step S211.

In Step S211, the CPU 21 ends the established connection. The CPU 21 proceeds to Step S212.

In Step S212, the CPU 21 returns the settings related to the user interface to the stored set values. The CPU 21 ends the reflection processing.

Since the processing of Step S203 is executed before the processing of Steps S205 and S209 as described above, the CPU 21 reflects the setting information in the settings related to the user interface of the image forming apparatus 20, which is used as the information processing apparatus, before an output from the user interface. Steps S205 and S209 are merely specific examples of an output from the user interface, and an output from the user interface is not limited thereto.

Further, since the processing of Step S203 is executed before the processing of Step S207 or S208, the CPU 21 reflects the setting information in the settings related to the user interface of the image forming apparatus 20, which is used as the information processing apparatus, before receiving the job information or before executing the job.

Furthermore, the CPU 21 temporarily reflects the received setting information in the settings related to the user interface of the image forming apparatus 20, which is used as the information processing apparatus, using the processing of Steps S202, S203, and S212. The CPU 21 may return the settings related to the user interface to the stored set values in a case where a time when the image forming apparatus 20 is not used by the smartphone 10 exceeds a predetermined time.

The processing of Step S204 may be executed at any time as long as being executed between Step S203 and Step S212. For example, the error may be an error in which the processing for establishing a connection in Step S206 fails. Further, for example, the error may be an error that is caused by the execution of the job in Step S208. Furthermore, the error may be an error caused by processing for starting to use the image forming apparatus that is executed after a connection request for starting to use the image forming apparatus is received. The processing for starting to use the image forming apparatus is, for example, processing for establishing a connection, processing for recovering from a power saving mode, processing for logging in executed by a user, or the like.

MODIFICATION EXAMPLES

The smartphone 10 or the image forming apparatus 20 according to the exemplary embodiment has been described above. However, the present disclosure is not limited to the exemplary embodiment. The present disclosure may have various improvements or modifications.

The terminal device may be a personal computer or a tablet-type terminal, or the like including a user interface. Further, the information processing apparatus may be an automated teller machine, a point of sales (POS), a vending machine, or the like including a user interface.

In Step S103 of FIG. 4, the CPU 11 may convert the setting information into settings related to the user interface of the image forming apparatus 20 on the basis of the conversion table and transmit the converted settings. The conversion table is prepared for each type of OS, each version of OS, or each model number of the model of the image forming apparatus 20. In this case, the CPU 21 does not execute Step S203 of FIG. 5.

In Step S201 of FIG. 5, the CPU 21 may be adapted to receive the connection request only in a case where there is no user in use. The CPU 21 determines that there is no user in use in a case where there is no user logged in or a case where there is no operation executed by a user for a certain period of time, or the like. Further, in Steps S201 to S212 of FIG. 5, the CPU 21 stops receiving an operation executed by another user. Accordingly, the image forming apparatus 20 can prevent processing, which is requested by a user in use, from being hindered by another user.

In FIG. 7, the conversion table may be a table in which the model number of the model of the smartphone 10 and the settings related to the user interface of the image forming apparatus 20 are associated with each other in advance. For example, in a case where the model of the smartphone 10 is a model for the elderly, the model number of the model of the smartphone 10 and the settings related to the user interface of the image forming apparatus 20 may be associated with each other so that a font size is converted into a value larger than the default.

The above-mentioned processing can also be realized by a dedicated hardware circuit. In this case, the processing may be executed by a piece of hardware or may be executed by a plurality of pieces of hardware.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

Further, a program for operating the smartphone 10 or the image forming apparatus 20 may be provided by a computer-readable recording medium, such as a universal serial bus (USB) memory, a flexible disk, or a compact disc read only memory (CD-ROM); or may be provided online via a network, such as the Internet. In this case, the program recorded in the computer-readable recording medium is usually transferred to a memory, a storage, or the like and is stored. Furthermore, for example, this program may be provided as single application software, or may be incorporated into the software of the smartphone 10 or the image forming apparatus 20 as a function of the smartphone 10 or the image forming apparatus 20.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a processor configured to:
receive setting information that includes settings related to a user interface reflected in a terminal device connected to use the information processing apparatus, wherein the settings related to the user interface reflected in the terminal device include setting items and set values; and
reflect the received setting information in settings related to a user interface of the information processing apparatus, by reflecting a set value, which is obtained for each of the setting items from a conversion table in which a set value of the terminal device and a set value of the information processing apparatus are associated with each other for each of the setting items in advance, on the basis of the conversion table.

2. The information processing apparatus according to claim 1, wherein the setting information includes a model number of a model, and the processor is configured to:
reflect the setting information in the settings related to the user interface of the information processing apparatus on the basis of the conversion table in which the model number of the model and the settings related to the user interface of the information processing apparatus are associated with each other in advance.

3. The information processing apparatus according to claim 2, wherein the processor is configured to:
receive the setting information when the processor receives a connection request for causing the information processing apparatus to start to be used by the terminal device.

4. The information processing apparatus according to claim 1, wherein the processor is configured to:
receive the setting information when the processor receives a connection request for causing the information processing apparatus to start to be used by the terminal device.

5. The information processing apparatus according to claim 1, wherein the processor is configured to:

reflect the setting information in the settings related to the user interface of the information processing apparatus before an output from the user interface of the information processing apparatus.

6. The information processing apparatus according to claim 1, wherein the processor is configured to:
reflect the setting information in the settings related to the user interface of the information processing apparatus before receiving job information used to execute a function of the information processing apparatus from the terminal device.

7. The information processing apparatus according to claim 1, wherein the processor is configured to:
temporarily reflect the received setting information in the settings related to the user interface of the information processing apparatus.

8. The information processing apparatus according to claim 7, wherein the processor is configured to:
store current set values before reflecting the setting information in the settings related to the user interface of the information processing apparatus, and
return the settings related to the user interface of the information processing apparatus to the stored set values in a case where a connection with the terminal device ends.

9. The information processing apparatus according to claim 8, wherein the processor is configured to:
return the settings related to the user interface of the information processing apparatus to the stored set values in a case where a time when the information processing apparatus is not used by the terminal device exceeds a predetermined time.

10. A terminal device comprising:
a processor configured to:
transmit setting information, which includes settings related to a user interface reflected in the terminal device, to cause the setting information to be reflected in an external information processing apparatus,
wherein the settings related to the user interface reflected in the terminal device include setting items and set values, and
wherein a set value, which is obtained for each of the setting items from a conversion table in which a set value of the terminal device and a set value of the external information processing apparatus are associated with each other for each of the setting items in advance, is reflected in the external information processing apparatus on the basis of the conversion table.

11. A non-transitory computer readable medium storing an information processing program causing a computer to execute a process comprising:
receiving setting information that includes settings related to a user interface reflected in a terminal device connected to use an information processing apparatus, wherein the settings related to the user interface reflected in the terminal device include setting items and set values; and
reflecting the received setting information in settings related to a user interface of the information processing apparatus, by reflecting a set value, which is obtained for each of the setting items from a conversion table in which a set value of the terminal device and a set value of the information processing apparatus are associated with each other for each of the setting items in advance, on the basis of the conversion table.

12. A non-transitory computer readable medium storing an information processing program causing a computer to execute a process comprising:
transmitting setting information, which includes settings related to a user interface reflected in a terminal device, to cause the setting information to be reflected in an external information processing apparatus,
wherein the settings related to the user interface reflected in the terminal device include setting items and set values, and
wherein a set value, which is obtained for each of the setting items from a conversion table in which a set value of the terminal device and a set value of the external information processing apparatus are associated with each other for each of the setting items in advance, is reflected in the external information processing apparatus on the basis of the conversion table.

* * * * *